(12) United States Patent
Mei et al.

(10) Patent No.: US 10,996,099 B2
(45) Date of Patent: May 4, 2021

(54) LOAD CELL WITH OVERLOAD PROTECTION

(71) Applicants: MEASUREMENT SPECIALTIES, INC., Hampton, VA (US); Measurement Specialties (China) Ltd., Shenzhen (CN)

(72) Inventors: Hai Mei, Pelham, NH (US); Qineng Hu, Shenzhen (CN)

(73) Assignees: MEASUREMENT SPECIALTIES (CHINA) LTD., Shenzhen (CN); MEASUREMENT SPECIALTIES, INC., Hampton, VA (US)

( * ) Notice: Subject to any disclaimer, the term of this patent is extended or adjusted under 35 U.S.C. 154(b) by 27 days.

(21) Appl. No.: 16/258,915

(22) Filed: Jan. 28, 2019

(65) Prior Publication Data

US 2020/0056930 A1    Feb. 20, 2020

(30) Foreign Application Priority Data

Aug. 17, 2018    (CN) .......................... 201810941151.5

(51) Int. Cl.
*G01G 3/14*    (2006.01)
*G01G 23/00*    (2006.01)

(52) U.S. Cl.
CPC ......... *G01G 23/005* (2013.01); *G01G 3/1404* (2013.01); *G01G 3/1412* (2013.01)

(58) Field of Classification Search
CPC .. G01G 23/005; G01G 3/1412; G01G 3/1404; G01L 5/225; G01L 1/26; G01L 1/2243
See application file for complete search history.

(56) References Cited

U.S. PATENT DOCUMENTS

| 4,254,841 A | * | 3/1981 | Loskill | ...................... G01L 1/26 177/154 |
| 4,338,825 A | | 7/1982 | Amlani et al. | |
| 4,501,160 A | | 2/1985 | Johnson | |
| 4,899,599 A | * | 2/1990 | Eddens | ................. G01L 1/2243 73/862.382 |

(Continued)

FOREIGN PATENT DOCUMENTS

| JP | 11295162 A | * | 10/1999 | ............... G01G 3/14 |
| WO | 2005121721 A1 | | 12/2005 | |

(Continued)

OTHER PUBLICATIONS

SICE-ICASE International Joint Conference 2006 Oct. 18-21, 2006 in Bexco, Busan, Korea Research of protection equipment for the load cell receiving a large impact load, Makoto Makabe1 and Shogo Harada2 (Year: 2006).*

(Continued)

*Primary Examiner* — Jacques M Saint Surin

(57) ABSTRACT

A load cell that includes a beam extending from a fixed section to a load section including a deflection section that moves under a load and a central beam section spaced from the deflection section. At least one strain gauge is coupled to the beam for detecting movement of the beam. A stop element including a bearing surface is also provided and coupled to the beam and configured such that the bearing surface does not engage the beam in a first position and engages the beam in a second position.

19 Claims, 8 Drawing Sheets

(56) References Cited

U.S. PATENT DOCUMENTS

| | | | | |
|---|---|---|---|---|
| 5,220,971 | A * | 6/1993 | Farr | G01G 3/1412 |
| | | | | 177/211 |
| 5,591,944 | A * | 1/1997 | Meyer | G01G 3/1412 |
| | | | | 177/154 |
| 6,755,087 | B2 * | 6/2004 | Clegg | G01G 23/005 |
| | | | | 73/862.621 |
| 9,046,434 | B2 * | 6/2015 | Nagai | G01L 1/2243 |
| 9,709,436 | B2 * | 7/2017 | Johnson | G01G 3/1412 |
| 2014/0262557 | A1 * | 9/2014 | Johnson | G01G 3/14 |
| | | | | 177/211 |

FOREIGN PATENT DOCUMENTS

| | | | | |
|---|---|---|---|---|
| WO | WO2012049714 | * | 4/2012 | G01G 23/005 |
| WO | WO2014068761 A1 * | | 5/2014 | G01L 1/26 |

OTHER PUBLICATIONS

IEEE Sensors Journal, vol. 9, No. 12, Dec. 2009 1741, A Novel Miniature Four-Dimensional Force/Torque Sensor With Overload Protection Mechanism Qiaokang Liang, Dan Zhang, Senior Member, IEEE, Yunjian Ge, and Quanjun Song (Year: 2009).*

Partial European Search Report, European Application No. 19191897.8-1001, European Filing dated Jan. 7, 2020.

* cited by examiner

LOAD CELL WITH OVERLOAD PROTECTION

CROSS-REFERENCE TO RELATED APPLICATIONS

This application claims priority to China Patent Application No. 201810941151.5, which was filed Aug. 17, 2018 and is titled LOAD CELL WITH OVERLOAD PROTECTION. The subject matter of which is herein incorporated by reference in its entirety.

BACKGROUND OF THE INVENTION

The subject matter herein relates generally to load cells and manufacturing methods for making the same.

Load cells are used for many different applications in order to measure forces and torques and convert them into electrical signals. Strain gauge load cells are the most common type.

In particular, strain gauge load cells measure the resistance variances of a strain gauge as a result of deformation of a material because of a load. Under a constant input excitation voltage, such variances are detected, even for small deflections such that load can be determined. Common strain gauge load cells include shear beam load cells, platform load cells, double-ended shear beam load cells, bending beam load cells, and the like.

When manufacturing a load cell many considerations exist for any given use of the load cell. Such considerations include costs, machinability, reproducibility, spatial requirements, durability, accuracy, overload capability, material characteristics, and the like. Often, in an effort to save costs, the robustness and performance of the load cell can be sacrificed. In one instance, often manufactures desire to utilize a material such as aluminum instead of more expensive materials such as stainless steel to keep cost down. However, aluminum is not as strong as stainless steel making such load cells more susceptible to yielding conditions and thus inaccuracies, drifts, damage, and/or malfunction as a result of an overloading condition such as a drop condition.

Accordingly, there is a need to increase the robustness of a strain gauge load cell while minimizing additional cost. Additionally, a need exists to have such increased robustness while still accomplishing efficient manufacturing processes.

BRIEF DESCRIPTION OF THE INVENTION

In an embodiment, a load cell is provided that includes a beam extending from a fixed section to a load section including a deflection section that moves under a load and a central beam section spaced from the deflection section. The load cell also includes at least one strain gauge coupled to the beam for detecting movement of the beam, and a stop element including a bearing surface coupled to the beam and configured such that the bearing surface does not engage the beam in a first position and engages the beam in a second position.

In another embodiment, a load cell is provided that includes a beam extending from a fixed section to a load section that is configured to receive a load, the beam including a central beam section spaced from the load section to form a channel between the load section and central beam section. The load cell also includes at least one strain gauge coupled to the beam for detecting movement of the beam, and an adjustable stop element secured to the central beam section and extending through the channel into the load section, the stop element configured to engage the load section above a threshold load in a first direction and engage the load section above the threshold load in a second direction.

In another embodiment an exercise device is provided that includes a frame, at least one pedal coupled to the frame, and a flywheel coupled to the frame and at least one pedal to rotate in response to movement of the at least one pedal. The exercise device also includes an eddy current brake with a first magnet spaced from a second magnet with the flywheel disposed therebetween. A load cell including a beam with a load section is coupled to the magnets such that movement of the first magnet in a first direction places a load on the load section, the load cell including a stop element disposed with the beam to prevent movement of the beam above a threshold force.

DETAILED DESCRIPTION OF THE INVENTION

Embodiments herein set forth strain gauge load cells that are illustrated as shear beam type strain gauge load cells. For example, exemplary embodiments include strain gauge load cell with a fixed section, first and second side deflection sections with a central beam section spaced therebetween, a load section, stop elements, and strain gauges electrically connected to form a full Wheatstone bridge. Such exemplary embodiments are exemplary and additional strain gauge load cells such as platform load cells, double-ended shear beam load cells, bending beam load cells, and the like are contemplated. Similarly, additional strain gauge arrangements are similarly contemplated including half (½) Wheatstone bridge arrangements, quarter (¼) Wheatstone bridge arrangements, and the like. Exemplary embodiments of the load cell include at least one stop element positioned in a channel of the load cell to provide supplemental support in case of an overload condition on the load cell, including as a result of dropping the load cell, to prevent a yielding condition.

Figure 1:
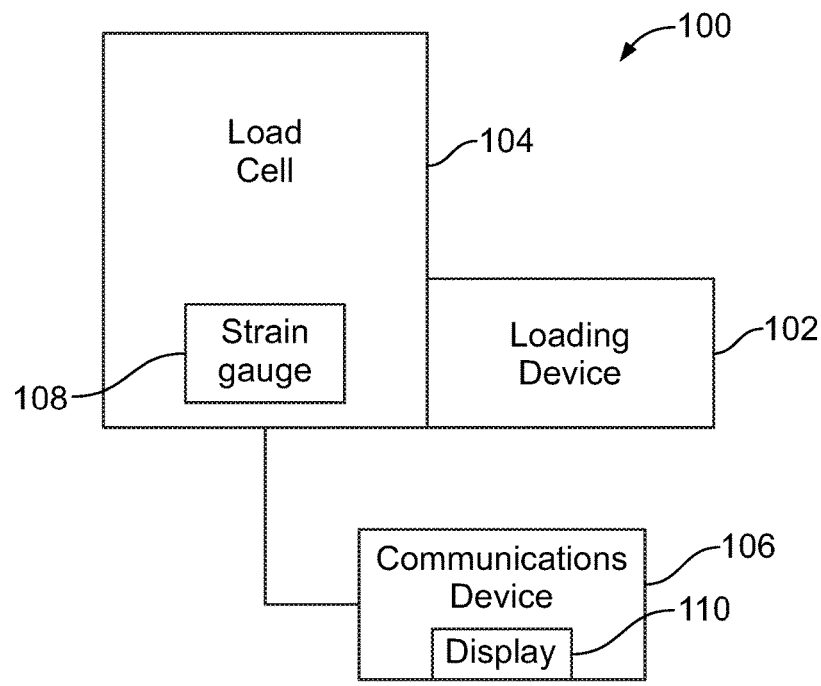
FIG. 1 is a schematic view of a system utilizing a load cell in accordance with an exemplary embodiment.

FIG. 1 is a schematic view of a loading system 100 formed in accordance with an embodiment. The loading system 100 includes a loading device 102, load cell 104, and communication device 106. In one example, the loading device 102 is a braking system on a stationary bicycle. Typically the loading device 102 engages and provides a load in a single direction on the load cell 104 causing deformation of the load cell 104. The load cell 104 may be any type, including a shear beam load cell, platform load cell, double-ended shear beam load cell, bending beam load cell, and the like. The load cell 104 includes strain gauges 108 that detect movement or deflections of the beam of the load cell and send electronic signals to the communication device. The communication device 106 includes a display 110 that presents the readings from the strain gauges 108 to a user. The communication device 106 in example embodiments include CPUs, smart phones, hand held devices, laptop computers, smart watches, other smart devices, and the like that transmit and process data and information for display.

FIGS. 2A-4D illustrate an exemplary embodiment of a load cell 200 that in one example is load cell 104 of FIG. 1. In this example the load cell is a shear beam load cell. The load cell 200 includes a beam, or body, 202, fixed section 204, moveable load section 206, first moveable deflection section 208, second moveable deflection section 210, and central beam section 211.

The beam 202 extends from the fixed section 204 to the load section 206. The first moveable deflection section 208 and second moveable deflection section 210 extend from the fixed section 204 in parallel spaced relation and extend to the load section 206.

Each of the first deflection section 208 and second deflection section 210 include an arcuate portion 212 and 214 that provide a thin or reduced width along each section 208, 210. At least one strain gauge 216 is secured along an outer surface of each section 208, 210. In the embodiment of FIGS. 2A-4D, four strain gauges 216 are utilized and are electrically connected to one another as a Wheatstone bridge circuit. When a load acts upon the load cell 200 two strain gauges are in compression while two are in tension. In other examples only two strain gauges 216 in a half Wheatstone bridge arrangement, or a single strain gauge 216 in a quarter Wheatstone bridge arrangement are utilized. As illustrated, a first set of strain gauges 218 are placed on either side of the thinnest portion of the first deflection section 208, while a second set of strain gauges 220 are placed on either side of the thinnest portion of the second section 210. Thus, as a load is placed transverse to the load section 206, the distance between the strain gauges 216 in each set 218, 220 varies based on the direction of the load. The variance in distance between the strain gauges 216 in each set 218, 220 results in a corresponding variance in resistance and thus the voltage potential is varied that is used to determine load.

The central beam section 211 extends from the fixed section 204 of the beam 202 to the load section 206 in parallel spaced relation between the first deflection section 208 and second deflection section 210. In this manner, a first channel 224 is formed between the first deflection section 208 and the central beam section 211, and a second channel 226 is formed between the second deflection section 210 and central beam section 211. Similarly, a third channel 228 is formed between the central beam section 211 and the load section 206 and is in communication with the first and second channels 224 and 226. Specifically, the first channel 224 and second channel 226 extend in parallel spaced relation while the third channel 228 extends between the first channel 224 and second channel 226 transverse to the first and second channels 224, 226. Consequently, the first deflection section 208 may move relative to the central beam section 211 through the first channel 224 and second deflection section 210 may move relative to the central beam section 211 through the second channel 226.

In an alternative example embodiment of FIGS. 2A-4D the central beam 211 is mounted to be fixed, similar to the fixed section 204 and positioned to provide overload support for the first deflection section 208 and/or second deflection section 210. Specifically, the central beam section 211 is configured such that the tolerance, or width of the first channel 224 and/or second channel 226 results in the engagement of the central beam section 211 by either the first deflection section 208 or second deflection section 210 before a yield condition. In this manner the central beam section 211 provides overload support for the first deflection section 208 and/or second deflection section 210. Optionally, even if the central beam section 211 is not fixed, by being configured to have a tolerance that causes engagement of the first deflection section 208 and/or second deflection section 210, the rigidity of the central beam section 211 supplements the first deflection section 208 or second deflection section to minimize and prevent a yield condition as a result of overloading.

In the example of FIGS. 2A-4D, an overload protection system 230 is provided. The overload protection system 230 includes a first bore 232, first stop element 234, second bore 236, second stop element 238, third bore 240, and third stop element 242.

Figure 3:
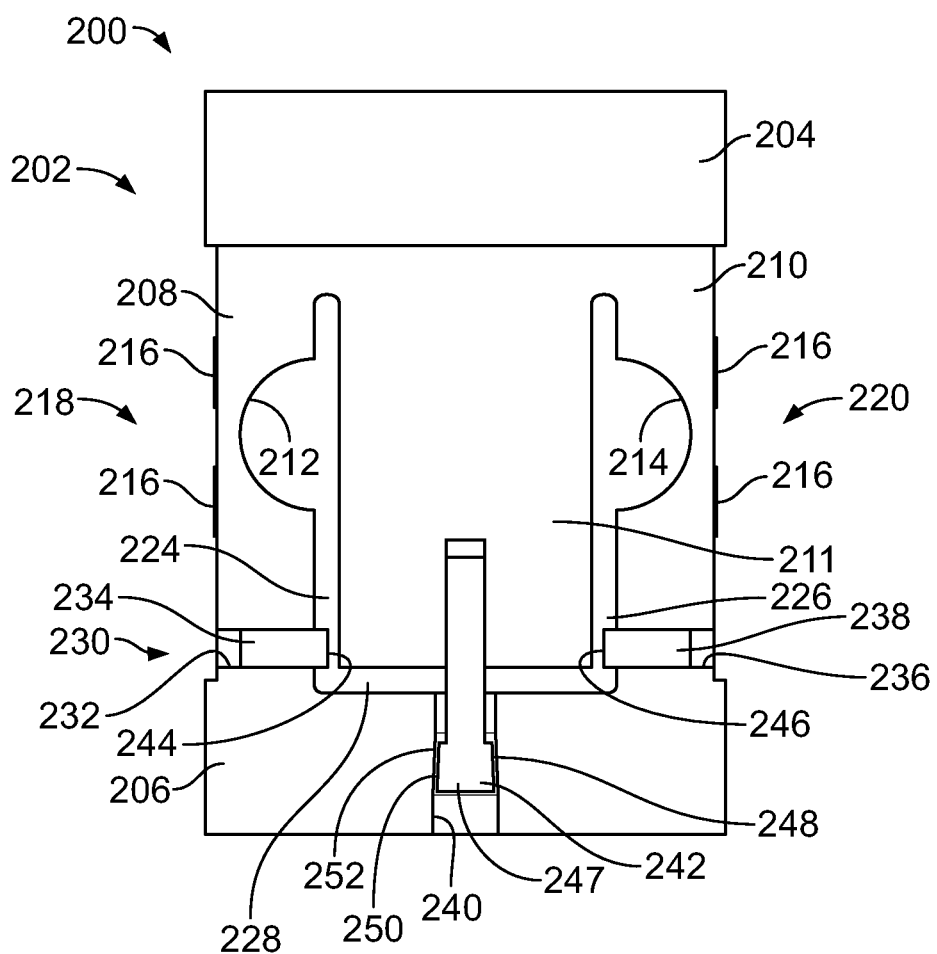
FIG. 3 is a sectional view of a load cell in accordance with an exemplary embodiment.

As illustrated in the exemplary section view of FIG. 3, the first bore 232 is disposed through the first deflection section 208 adjacent the central beam section 211 and receives the first stop element 234 that is partially disposed into the first channel 224. In one example the first stop element 234 is a pin element that includes a bearing surface 244 for engaging the central beam section 211. While in the example the first stop element 234 is illustrated as a pin element disposed through the first bore 232 in the first deflection section 208, the first stop element 234 may be partially disposed within the first channel 224 in other manners, including threading the first stop element 234 through the first bore 232, welding, bonding, or staking the first stop element 234 to the first deflection section 208, or the like. Likewise, the first stop element in one example may similarly be disposed within a bore of the central beam section 211 or secured to the central beam section 211 at any location along the first channel 224 through welding, bonding, staking, or the like.

The first stop element 234 is positioned adjacent the load section 206 of the load cell 200. By positioning the first stop element 234 adjacent the load section 206 of the load cell 200, support is provided by the first stop element 234 at a location where the greatest moment force is occurring, maximizing support. Still, while the first stop element 234 is illustrated as extending into the first channel 224 adjacent the load section 206 of the load cell 200, for ease of manufacturing, the first stop element 234 may be located partially disposed anywhere along the first channel 224 to provide support to the first deflection section 208. In another alternative embodiment, again, for ease of manufacturing, the first stop element 234 may be received within a bore (not shown) of the central beam section 211, or similarly be attached the central beam section 211 via welding, bonding, staking, or the like that results in the first stop element 234 to be partially disposed within the first channel 224. In the alternative embodiments, the first stop element 234 is located at a position that facilitates manufacturing.

Figure 2A:
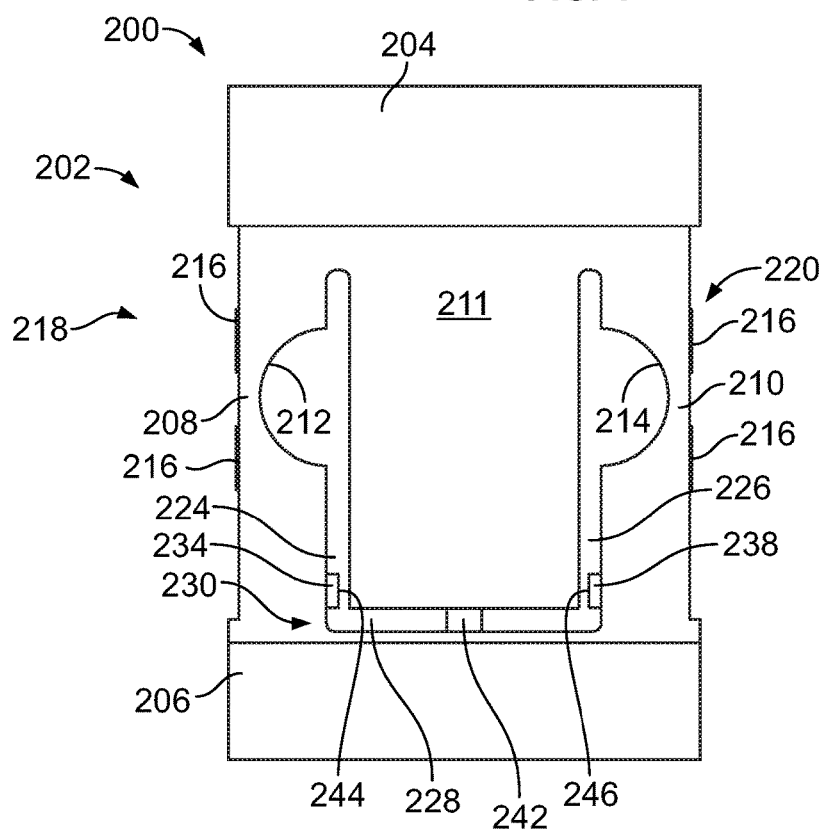
FIG. 2A is top plan view of a load cell formed in accordance with an exemplary embodiment.
Figure 2B:
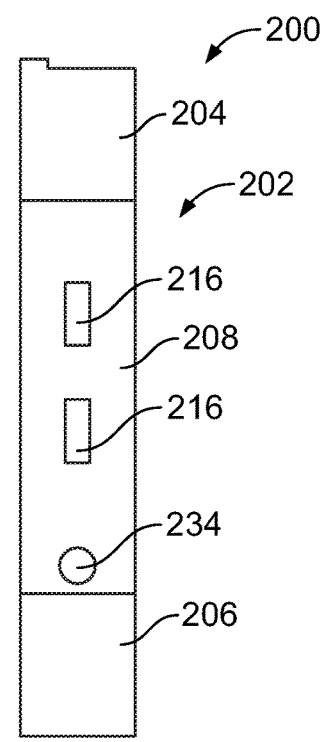
FIG. 2B is a side plan view of a load cell in accordance with an exemplary embodiment.
Figure 2C:
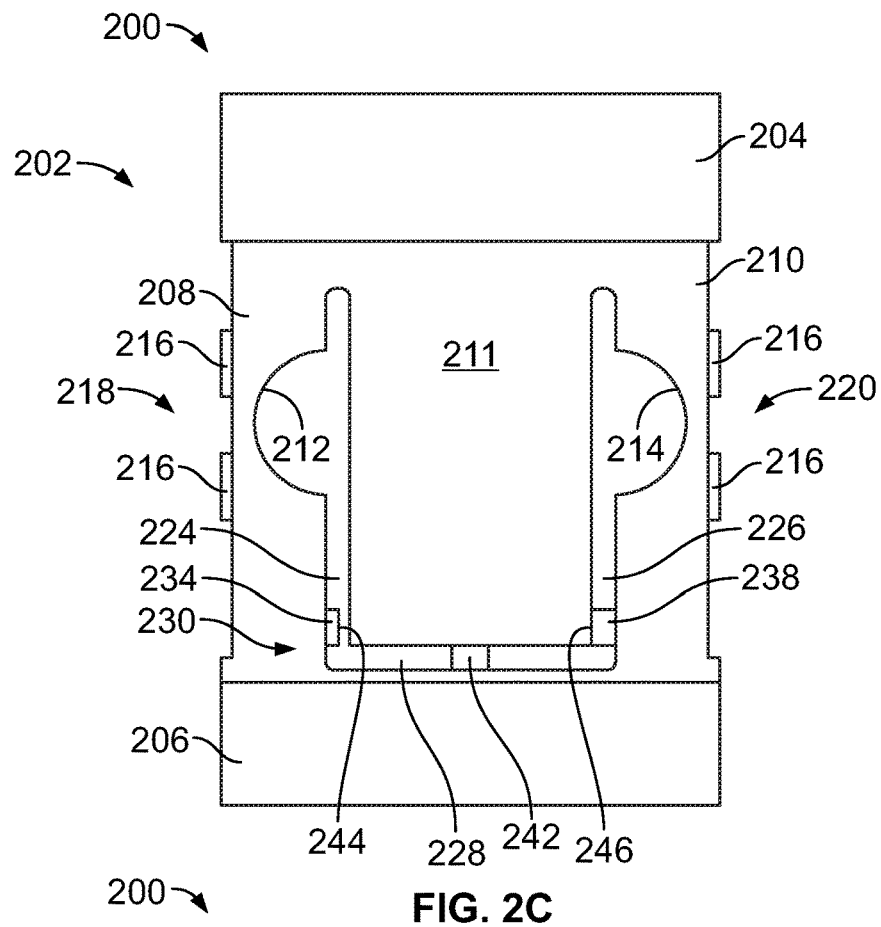
FIG. 2C is top plan view of a load cell formed in accordance with an exemplary embodiment.
Figure 2D:
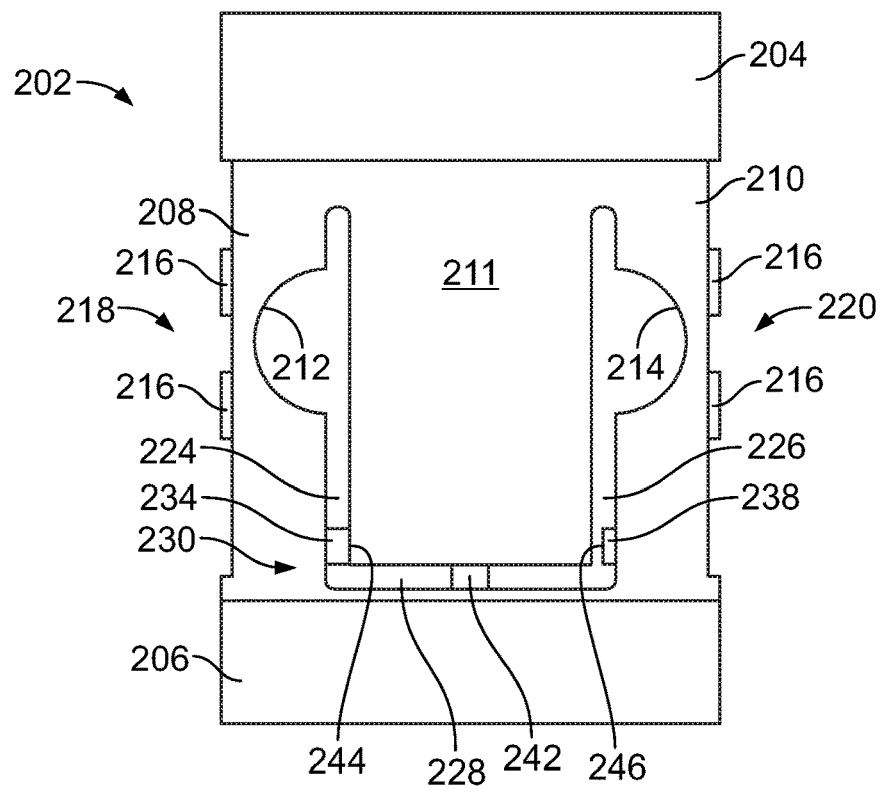
FIG. 2D is top plan view of a load cell formed in accordance with an exemplary embodiment.

By utilizing the first bore 232 in association with the first stop element 234, the first stop element 234 may be adjusted, or positioned in the first channel 224 at a predetermined distance from the central beam section 211. In this manner, depending on the yield condition of the material of the load cell 200 the first stop element 234 may be positioned to prevent a yield condition within the first deflection section 208 when an overload condition on the load cell 200 occurs. Specifically, when a load is presented on the load section 206 transverse to the load section 206 in a first direction, the first stop element 234 moves with the first deflection section 208 from a first position (FIG. 2A) and when the load exceeds a threshold load the bearing surface 244 of the first stop element engages the central beam section 211 in a second position (FIG. 2D). The first stop element 234 thus prevents additional movement of the first deflection section 208 through the first channel 224. Consequently, by adjusting the position of the first stop element 234 within the first channel 224 a user can limit the movement of the first deflection section 208 to prevent a yield condition on the first deflection section 208 during an overload condition.

In one example the amount of force that is required to result in a yield condition of the material may be calculated and the first stop element 234 may be positioned to prevent the yield condition during an overload condition, such as a drop condition of the load cell. In one example this calculated force is the threshold load such that below the threshold load the bearing surface 244 of the first stop element 234 does not engage the central beam section 211 and above the threshold load the first stop element 234 engages the central beam section 211. Alternatively, the threshold load is the load at which at least one of the strain gauges 218 is damaged or malfunctions. Alternatively, the first stop element 234 may be custom set by adjusting the limit load and position of the first stop element 234 to engage the central beam section 211. In this manner mechanical size variations, including deflection variation by the same load are addressed.

The second bore 236 is disposed through the second deflection section 210 adjacent the central beam section 211 and receives the second stop element 238 that is partially disposed into the second channel 226. In one example the second stop element 238 is a pin element that includes a bearing surface 246 for engaging the central beam section 211. While in the example the second stop element 238 is illustrated as a pin element disposed through the second bore 236 in the second deflection section 210, the second stop element 238 may be partially disposed within the second channel 226 in other manners, including threading the second stop element 238 through the second bore 236, welding, bonding, or staking the second stop element 238 to the second deflection section 210, or the like. Likewise, the second stop element in one example may similarly be disposed within a bore of the central beam section 211 or secured to the central beam section 211 at any location along the second channel 226 through welding, bonding, staking, or the like.

The second stop element 238 is positioned adjacent the load section 206 of the beam 202. By positioning the second stop element 238 adjacent the load section 206 of the beam 202, support is provided by the second stop element 238 at a location where the greatest moment force is occurring, maximizing support. Still, while the second stop element 238 is illustrated as extending into the second channel 226 adjacent the load section 206 of the beam 202, for ease of manufacturing, the second stop element 238 may be located partially disposed anywhere along the second channel 226 to provide support to the second deflection section 210. In another alternative embodiment, again, for ease of manufacturing, the second stop element 238 may be received within a bore (not shown) of the central beam section 211, or similarly be attached the central beam section 211 via welding, bonding, staking, or the like that results in the second stop element 238 to be partially disposed within the second channel 226. In the alternative embodiments, the second stop element 238 is located at a position that facilitates manufacturing.

By utilizing the second bore 236 in association with the second stop element 238, the second stop element 238 may be adjusted, or positioned in the second channel 226 at a predetermined distance from the central beam section 211. In this manner, depending on the yield condition of the material of the load cell 200 the second stop element 238 may be positioned to prevent a yield condition within the second deflection section 210 when an overload condition on the load cell 200 occurs. Specifically, when a load is presented on the load section 206 transverse to the load section 206 in a second direction opposite the first direction, the second stop element 238 moves with the second deflection section 208 from a first position (FIG. 2A) and when the load exceed a threshold load the bearing surface 246 of the second stop element engages the central beam section 211 in a second position (FIG. 2C). The second stop element 238 thus prevents additional movement of the second deflection section 210 through the second channel 226. Consequently, by adjusting the position of the second stop element 238 within the second channel 226 a user can limit the movement of the second deflection section 210 to prevent a yield condition on the second deflection section 210 during an overload condition.

In one example the amount of force that is required to result in a yield condition of the material may be calculated and the second stop element 238 may be positioned to prevent the yield condition during an overload condition, such as a drop condition of the load cell. In one example this calculated force is the threshold load such that below the threshold load the bearing surface 246 of the second stop element 238 does not engage the central beam section 211 and above the threshold load the second stop element 238 engages the central beam section 211. Alternatively, the threshold load is the load at which at least one of the strain gauges 218 is damaged or malfunctions. Alternatively, the second stop element 238 may be custom set by adjusting the limit load and position of the second stop element 238 to engage the central beam section 211. In this manner mechanical size variations, including deflection variation by the same load are addressed.

The third bore 240 is disposed through the load section 206 of the beam 202 and receives the third stop element 242 that is disposed through the third channel 228 and is secured within the central beam section 211. In one example the third stop element 242 is a pin element that includes a head element 247 that forms a bearing surface 248 for engaging the load section 206. While in the example the third stop element 242 is illustrated as a pin element disposed through the third bore 240 in the load section 206 through the third channel 228 and into the central beam section 211, the third stop element 242 may be secured to the central beam section 211 in other manners, including threading the third stop element 242 into the central beam section 211, press fitting, gluing, bonding, or staking the third stop element 242 to the central beam section 211, or the like.

Figure 4A:
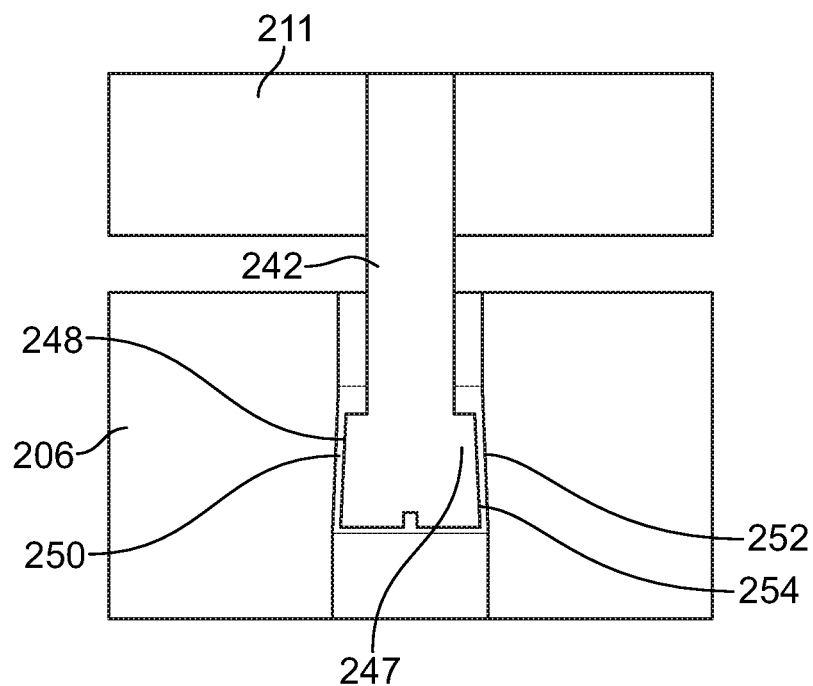
FIG. 4A is a partial sectional view of a load cell in accordance with an exemplary embodiment.
Figure 4B:
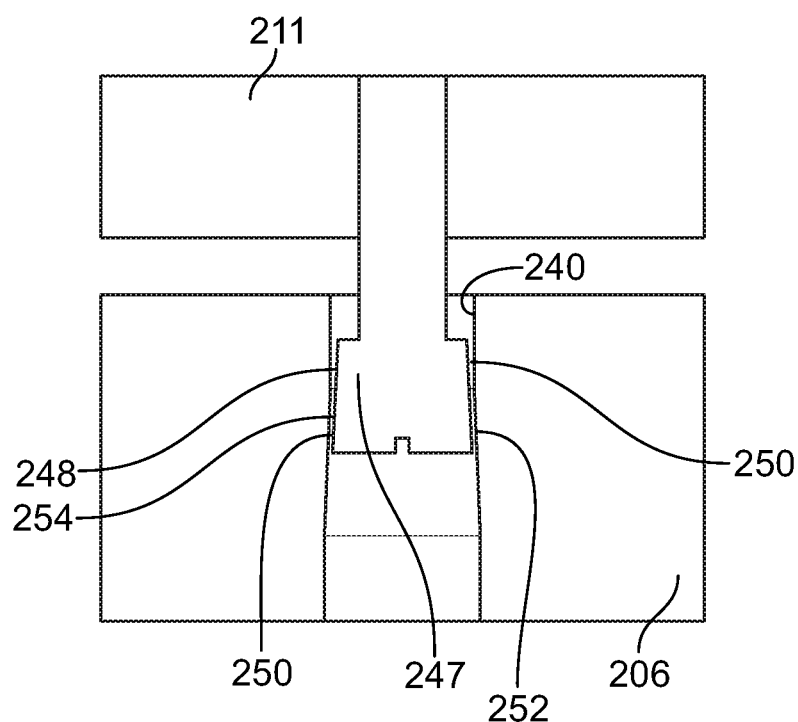
FIG. 4B is a partial sectional view of a load cell in accordance with an exemplary embodiment.
Figure 4C:
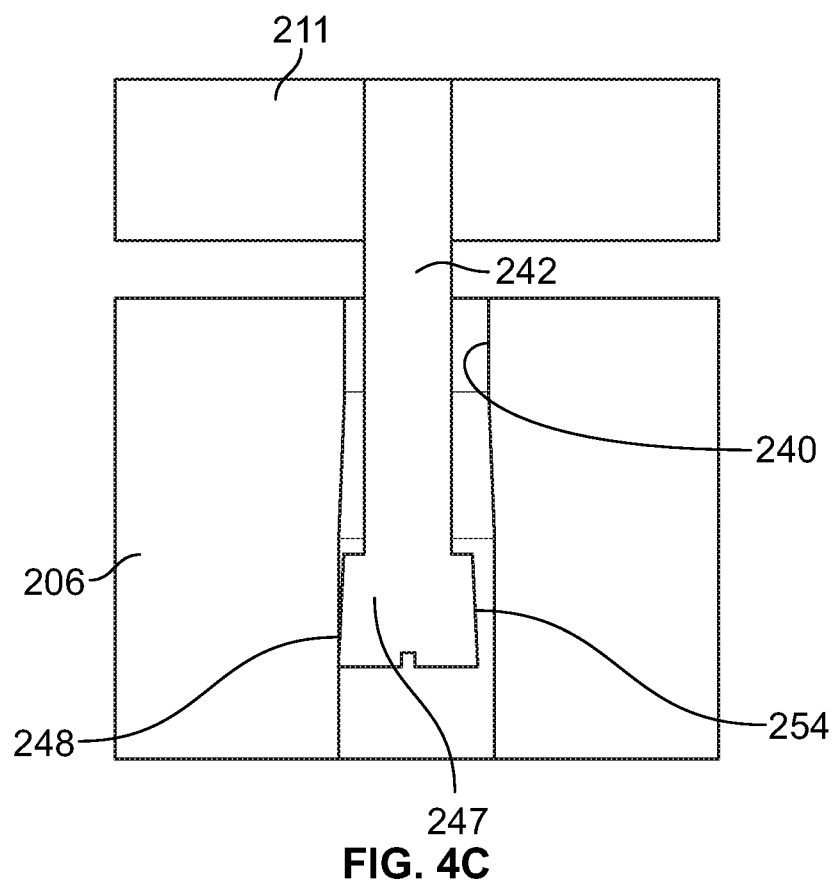
FIG. 4C is a partial sectional view of a load cell in accordance with an exemplary embodiment.
Figure 4D:
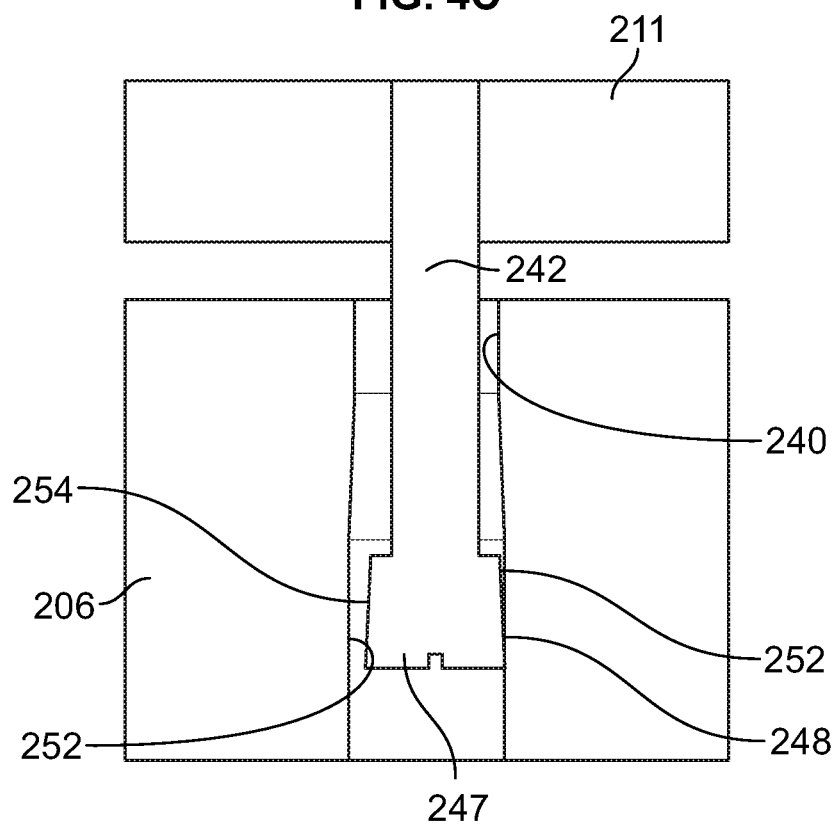
FIG. 4D is a partial sectional view of a load cell in accordance with an exemplary embodiment.

When the third stop element 242 is disposed within the third bore 240 in an unloaded condition or first position (FIG. 4A and FIG. 4B), a gap 250 is formed between the bearing surface 248 of the head element 247 and the load section 206. In this manner, when the load section 206 receives a load in a first direction the load section 206 moves relative to the third stop element 242. When a threshold load is reached the bearing surface 248 of the head element 247 engages the load section such that the head element 247, and thus the third stop element 242 and central beam section 211 support or resist additional movement of the load section 206 in a second position (FIG. 4C). Similarly, when the load section 206 receives a load in a second direction, opposite to the first direction, the load section 206 moves relative to the third stop element 242. When a threshold load is reached the bearing surface 248 of the head element 247 engages the load section such that the head element 247, and thus the third stop element 242 and central beam section 211 support or resist additional movement of the load section 206 in a third position (FIG. 4D). In this manner the third stop element 242 provides supplemental support or force in both the first direction and second direction, or bi-directionally, to prevent damage to the load cell as a result of reaching a yield condition due to an overloading condition.

In one example the amount of force that is required to result in a yield condition of the material may be calculated and the third stop element 242 may be positioned to prevent the yield condition during an overload condition, such as a drop condition of the load cell. In one example this calculated force is the threshold load such that below the threshold load the bearing surface 248 of the third stop element 242 does not engage the central beam section 211 and above the threshold load the third stop element 242 engages the load section 206. Alternatively, the threshold load is the load at which at least one of the strain gauges 218 is damaged or malfunctions. Alternatively, the third stop element 242 may be custom set by adjusting the limit load and position of the third stop element 242 to engage the central beam section 211. In this manner mechanical size variations, including deflection variation by the same load are addressed.

Likewise, the third stop element in one example may similarly be disposed within a bore of the central beam section 211 and/or secured to the load section 206 at any location along the third channel 228 through press fitting, gluing, bonding, or staking, or the like.

FIG. 4A-4D illustrate a partial view of an exemplary embodiment of the third bore 240 that receives the third stop element 242 within the load section 206. In this example embodiment the third bore 240 includes a tapered section 252 and the bearing surface 248 of the head element 247 of the third stop element 242 similarly has a corresponding tapered section 254. As a result of the tapered section 254 and/or tapered section 252 of the bore, the size of the gap 250 between the bearing surface 248 and the load section 206 can be adjusted by moving the third stop element through the third bore 240. Thus, the yield condition of the material of the first deflection section 208 and second deflection section 210 may be determined and the size of the gap 250 may be adjusted by movement of the third stop element 242 within the third bore 240 to provide the supplement support of the third stop element 242 to prevent either the first deflection section 208 or second deflection section 210 from reaching a yield condition.

While the exemplary embodiment of FIGS. 2A-4D illustrate a load cell 200 utilizing the first stop element 234, second stop element 238, and third stop element 242 as additional support for the first deflection section 208 or second deflection section, in other embodiments only one of the stop elements 234, 238, or 242 is utilized. In yet other embodiments, only two of the three stop elements 234 and 238, 234 and 242, or 238 and 242 are utilized to provide the additional support. Additionally, the stop elements 234, 238, and/or 242 may be made of the same material as the first deflection section 208, second deflection section 210, and/or central beam section 211 or from different material than the first deflection section 208, second deflection section 210, and/or central beam section 211 to provide additional supplemental support to the deflection sections 208, 210.

Figure 5A:
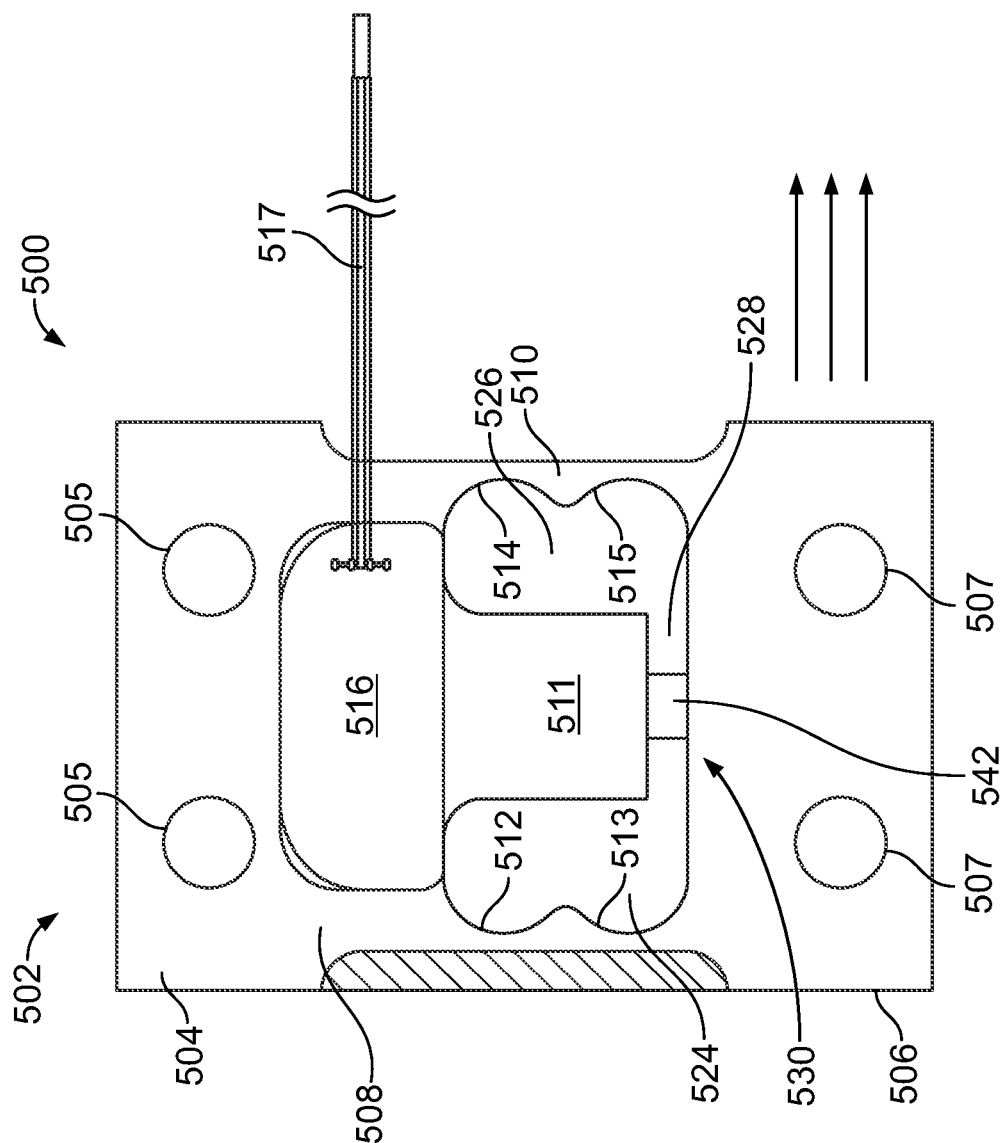
FIG. 5A is a top plan view of a load cell formed in accordance with an exemplary embodiment.
Figure 5B:
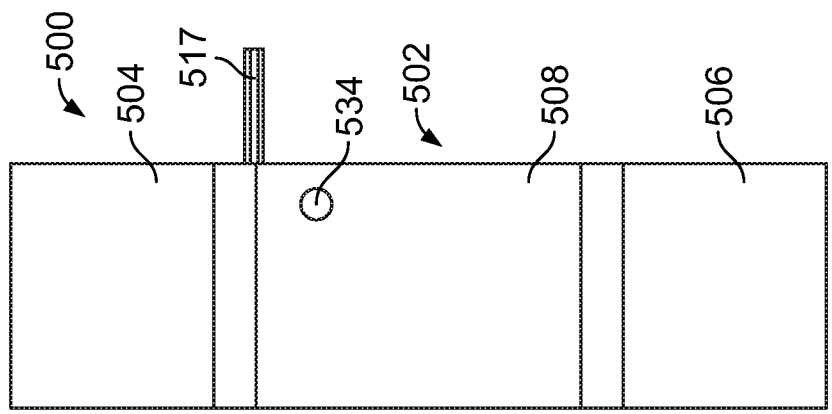
FIG. 5B is a side plan view of a load cell in accordance with an exemplary embodiment.
Figure 5C:
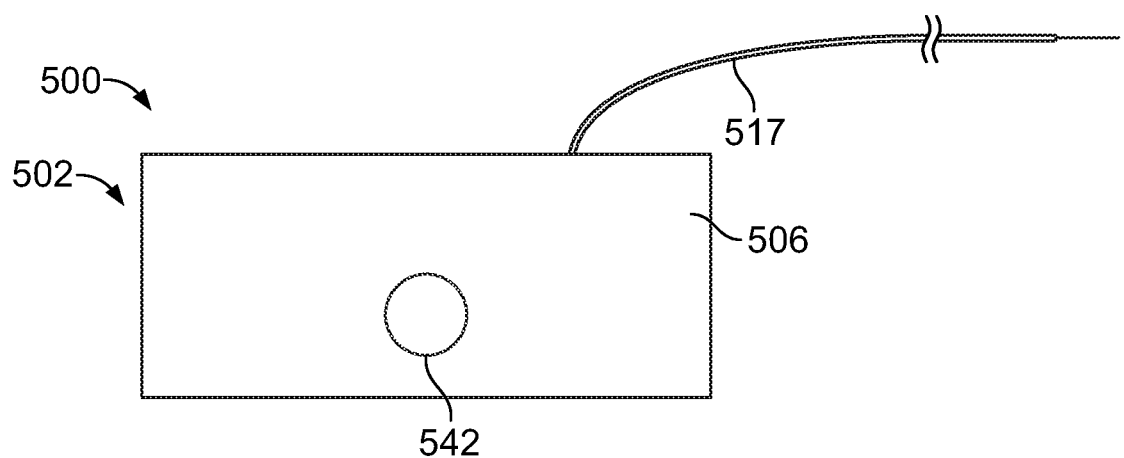
FIG. 5C is a front plan view of a load cell in accordance with an exemplary embodiment.

FIGS. 5A-5C illustrate yet another exemplary load cell 500 that in one example is load cell 104 of FIG. 1. In this example, similar to the load cell of FIGS. 2A-4D, the load cell 500 is a shear beam load cell. The load cell 500 includes a beam, or body, 502, fixed section 504, moveable load section 506, first moveable deflection section 508, second moveable deflection section 510, and central beam section 511.

The beam 502 extends from the fixed section 504 to the load section 506. In this embodiment the fixed section 504 includes openings 505 for securing to a bracket or device. In one embodiment the openings 505 are utilized to secure to load cell 500 to a bracket of a stationary exercise bike. Similarly, in this embodiment the load section 506 similarly includes openings 507 for attachment to a bracket or device, including in one example a bracket of a stationary exercise bike.

The first deflection section 508 and second deflection section 510 extend from the fixed section 504 in parallel spaced relation and extend to the load section 506. Each of the first deflection section 508 and second deflection section 510 include arcuate portions 512, 513, 514, and 515 that provide thin or reduced widths along each section 508, 510. In this embodiment, at least one strain gauge 516 is disposed within the beam 502. In the embodiment of FIGS. 5A-5C, four strain gauges 516 are utilized and are electrically connected to one another as a Wheatstone bridge circuit. In other examples only two strain gauges 516 in a half Wheatstone bridge arrangement, or a single strain gauge 516 in a quarter Wheatstone bridge arrangement are utilized. In this embodiment the power cord 517 that supplies constant voltage to the Wheatstone bridge is illustrated.

A central beam section 511 extends from the fixed section 504 of the beam 502 to the load section 506 in parallel spaced relation between the first deflection section 508 and second deflection section 510. In this manner, a first channel 524 is formed between the first deflection section 508 and the central beam section 511, and a second channel 526 is formed between the second deflection section 510 and central beam section 511. Similarly, a third channel 528 is formed between the central beam section 511 and the load section 506 and is in communication with the first and second channels 524 and 526. Specifically, the first channel 524 and second channel 526 extend in parallel spaced relation while the third channel 528 extends between the first channel 524 and second channel 526 transverse to the first and second channels 524, 526. Consequently, the first deflection section 508 may move relative to the central beam section 511 through the first channel 524 and second deflection section 510 may move relative to the central beam section 511 through the second channel 526.

In the example of FIGS. 5A-5C, similar to the exemplary embodiment of FIGS. 2A-4D an overload protection system 530 is provided. The overload protection system 530 includes a first stop element 534, second stop element (not shown), and third stop element 542. Each operates in a similar manner as previously described to provide overload protection for the load cell 500.

Figure 6:
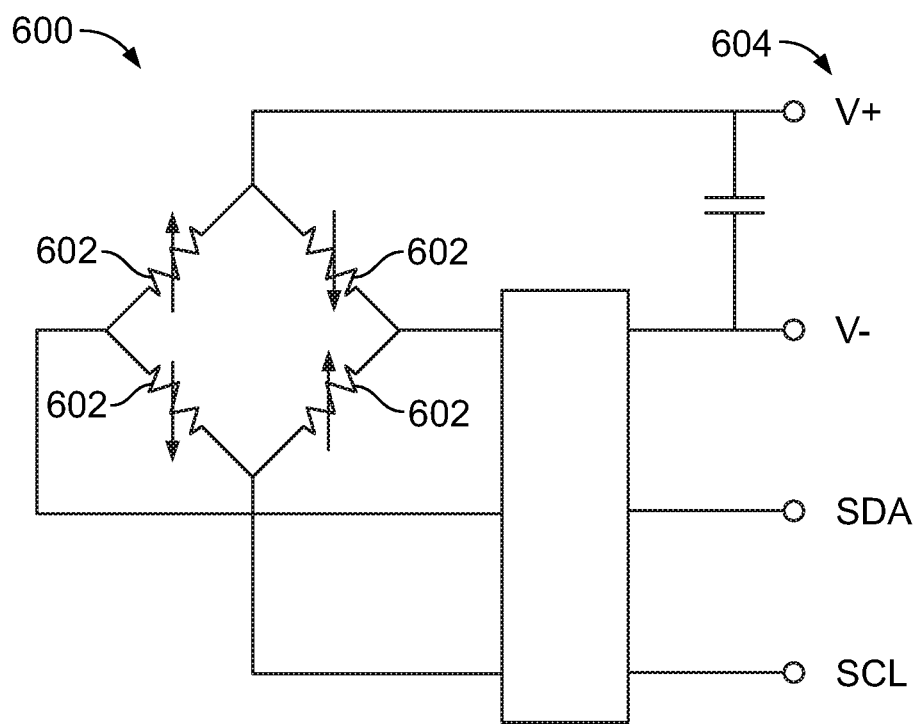
FIG. 6 is a schematic diagram of a circuit of a Wheatstone bridge circuit.

FIG. 6 illustrates a Wheatstone bridge circuit 600 that in one example is the digital output arrangement of the strain gauges 216 of load cell 200 of FIGS. 2A-4D and/or strain gauges 516 of the load cell 500 of FIGS. 5A-5C. As provided, the Wheatstone bridge circuit 600 can include four resistive elements 602 and a power source 604 that provides constant voltage to the bridge. Movement of this resistors in relation to one another results in a measurable change in voltage potential that is directly proportional to the load causing the movement. In this manner load is measured.

Figure 7:
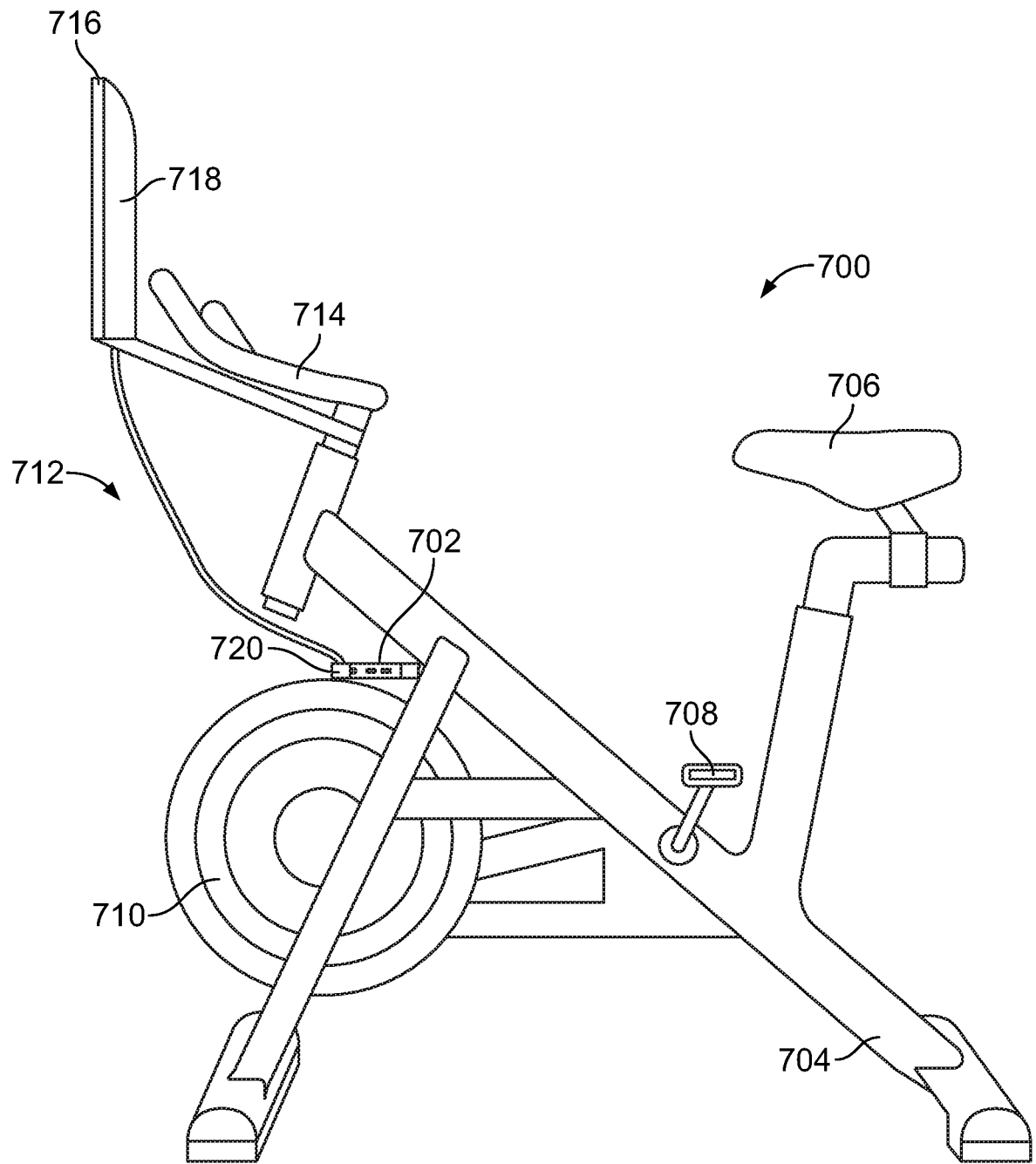
FIG. 7 is a perspective view of a load cell on a stationary bike in accordance with an exemplary embodiment.

FIG. 7 illustrates a system 700 utilizing a load cell 702 in accordance with at least one of the embodiments described herein. In one embodiment, the load cell 702 is load cell 200 of FIGS. 2A-4D and in another embodiment is load cell 500 of FIGS. 5A-5C. The system 700 is an exercise bike including a frame 704, seat 706, pedals 708, flywheel 710, braking system 712, handle bars 714, and CPU 716 with a display 718.

In this example, the braking system 712 is an eddy current braking system including an eddy current brake that utilizes magnets 720 on either side of the flywheel 710. As the flywheel rotates between the magnets an eddy current is formed such that the distance between the magnets 720 determines the resistance on the flywheel 710. The load cell 702 is placed on a bracket such that the movement of a magnet 720 places a load on the load section of the load cell 702. This load is measured by the load cell 702 and communicated to the CPU 716, or communication device, to monitor the power input by the rider. By utilizing the load cell 702 that includes stop elements for overloading protection, if during manufacturing, shipping, customer handling, or the like, the load cell underwent an overload condition as a result of a handler dropping the load cell, knocking over the bike, hitting the load cell, or the like, the stop element(s) provide mechanical safety stops that prevent the load cell from reaching a yield condition. This is even when the material of the load cell is easily bent and damaged.

In all, the mechanical stop elements 234, 238, 242, 534, 542 of the disclosed load cells 104, 200, 500, 702 are inexpensive and add minimal manufacturing requirements while providing an additional safety measure for relatively no cost. Thus, an improved load cell 104, 200, 500, 702 with enhanced overload protection is provided. Consequently, damage, malfunctioning, and replacement is reduced with little added cost or manufacturing time. Thus, at least all problems described have been solved.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A load cell comprising:
a beam extending from a fixed section to a load section including a deflection section configured to move under a load and a central beam section spaced from the deflection section;
at least one strain gauge coupled to the beam for detecting a load on the beam; and
a stop element including a bearing surface coupled to the beam and configured such that the bearing surface does not engage the beam in a first position and engages the beam in a second position based on the load on the beam, wherein in the first position the load on the beam is below a threshold load and in the second position the load on the beam is above the threshold load.

2. The load cell of claim 1, wherein a first channel is formed between the deflection section and the central beam section.

3. The load cell of claim 2, wherein the stop element is disposed within a bore of the deflection section and partially extends into the first channel in the first position and the bearing surface engages the central beam section in the second position.

4. The load cell of claim 3, wherein the deflection section is a first deflection section and the stop element is a first stop element, wherein the beam further includes a second deflection section spaced from the central beam section to form a second channel, the load cell further comprising:
a second stop element including a bearing surface disposed within a bore of the second deflection section and partially extending into the second channel in a first position of the second stop element and the bearing surface engaging the central beam section in a second position of the second stop element.

5. The load cell of claim 4, wherein the load section is spaced from the central beam section to form a third channel, the load cell further comprising:
a third stop element secured within the central beam section and extending through the third channel into the load section, the third stop element including a bearing surface, wherein in a first position of the third stop element a gap is formed between the bearing surface of the third stop element and the load section and in a second position of the third stop element the bearing surface engages the load section.

6. The load cell of claim 5, wherein in a third position of the third stop element the bearing surface of the third stop element engages the load section.

7. The load cell of claim 1, wherein the stop element is secured to the central beam section and extends into the load section, the stop element including a bearing surface, wherein a gap is formed between the bearing surface of the stop element and the load section.

8. The load cell of claim 7, wherein the stop element is secured to the central beam section by at least one of threading, press fitting, gluing, or staking.

9. The load cell of claim 7, wherein the bearing surface is tapered to vary the size of the gap between the bearing surface of the stop element and the load section.

10. The load cell of claim 9, wherein a bore of the load section that receives and engages the bearing surface is tapered.

11. The load cell of claim 1, wherein the threshold load is the load at which material of the beam yields.

12. The load cell of claim 1, wherein the at least one strain gauge is within a Wheatstone bridge circuit.

13. The load cell of claim 1, wherein the stop element is coupled to the beam through at least one of threading, welding, bonding, or staking.

14. A load cell comprising:
   a beam extending from a fixed section to a load section that is configured to receive a load, the beam including a central beam section spaced from the load section to form a channel between the load section and central beam section;
   at least one strain gauge coupled to the beam for detecting a load on the beam; and
   an adjustable stop element secured to the central beam section and extending through the channel into the load section, the adjustable stop element configured to engage the load section above a first threshold load in a first direction and engage the load section above a second threshold load in a second direction.

15. The load cell of claim 14, wherein the adjustable stop element includes a tapered head element.

16. The load cell of claim 14, wherein the load section includes a tapered bore that receives the adjustable stop element.

17. The load cell of claim 14, wherein the adjustable stop element includes threads and as the adjustable stop element is threaded into the central beam section a gap between a bearing surface of the adjustable stop element and the load section decreases in distance.

18. A load cell comprising:
   a beam extending from a fixed section to a load section including a deflection section configured to move under a load and a central beam section spaced from the deflection section;
   at least one strain gauge coupled to the beam for detecting a load on the beam; and
   a first channel formed between the deflection section and the central beam section;
   wherein the central beam section and deflection section are configured such that when the deflection section is above a threshold load the deflection section moves through the first channel and engages the central beam before the deflection section reaches a yield condition.

19. The load cell of claim 18, wherein the central beam section is fixed.

* * * * *